(12) United States Patent
Chen et al.

(10) Patent No.: US 11,299,433 B2
(45) Date of Patent: Apr. 12, 2022

(54) MANUFACTURING METHOD OF MAGNESIUM-ALUMINIUM SPINEL BRICK AND MAGNESIUM-ALUMINIUM SPINEL BRICK MANUFACTURED BY THE METHOD

(71) Applicant: ZIBO CITY LUZHONG REFRACTORIES CO., LTD., Zibo (CN)

(72) Inventors: Junhong Chen, Beijing (CN); Jisheng Feng, Zibo (CN); Yuanping Jia, Zibo (CN); Yanxia Wu, Luoyang (CN); Bo Zhu, Zibo (CN); Yutao Guo, Zibo (CN)

(73) Assignee: ZIBO CITY LUZHONG REFRACTORIES CO., LTD., Zibo (CN)

( * ) Notice: Subject to any disclaimer, the term of this patent is extended or adjusted under 35 U.S.C. 154(b) by 499 days.

(21) Appl. No.: 16/768,888

(22) PCT Filed: Dec. 16, 2016

(86) PCT No.: PCT/CN2016/110249
§ 371 (c)(1),
(2) Date: Jun. 2, 2020

(87) PCT Pub. No.: WO2017/101827
PCT Pub. Date: Jun. 22, 2017

(65) Prior Publication Data
US 2020/0361827 A1    Nov. 19, 2020

(30) Foreign Application Priority Data
Dec. 16, 2015    (CN) .......................... 201510936752.3

(51) Int. Cl.
*C04B 37/00*    (2006.01)
*C04B 35/043*    (2006.01)
(Continued)

(52) U.S. Cl.
CPC .............. *C04B 37/008* (2013.01); *B28B 3/00* (2013.01); *C04B 2237/341* (2013.01); *C04B 2237/343* (2013.01)

(58) Field of Classification Search
CPC ... C04B 35/043; C04B 35/443; C04B 35/662; C04B 2237/343; C04B 2237/341; C04B 37/008
See application file for complete search history.

(56) References Cited

U.S. PATENT DOCUMENTS 4,729,974 A  *  3/1988  Nazirizadeh .......... C04B 35/043
                                                        501/108
8,030,236 B2   10/2011  Klischat et al.
2017/0341984 A1*  11/2017  Jansen .................... C04B 35/20

FOREIGN PATENT DOCUMENTS

CN     101412629 A     4/2009
CN     101450867 A     6/2009
(Continued)

OTHER PUBLICATIONS

Xiaohai Xu et. al., Technical manual of refractory materials, Metallurgical Industry Press, 2000, pp. 202.
(Continued)

*Primary Examiner* — Alex B Efta
(74) *Attorney, Agent, or Firm* — Bayramoglu Law Offices LLC

(57) ABSTRACT

A manufacturing method of a low heat-conducting magnesium-aluminium spinel brick includes: (1) evenly mixing sintered magnesia, fused magnesia, magnesium-aluminium spinel and corundum to prepare flame retardant coating raw material mixed powder, adding naphthalene binder to the flame retardant coating raw material mixed powder to prepare the flame retardant coating raw materials after evenly mixing; (2) evenly mixing forsterite, fayalite and magnesia, adding the naphthalene binder to the mixed powder, mould- (Continued)

ing, drying, and then burning to obtain aggregate composite hortonolite raw materials; adding the naphthalene binder to the aggregate composite hortonolite having granularity ≤5 mm to prepare the thermal insulating layer raw materials after evenly mixing; (3) spacing and loading the flame retardant coating raw materials and the thermal insulating layer raw materials in a mold, pressing into green bricks, keeping the green bricks at a temperature of 110° C. for 24 hours, drying, and burning into magnesium-aluminium spinel bricks.

18 Claims, 3 Drawing Sheets

(51) Int. Cl.
*C04B 35/05* (2006.01)
*C04B 35/20* (2006.01)
*C04B 35/443* (2006.01)
*B28B 3/00* (2006.01)

(56) References Cited

FOREIGN PATENT DOCUMENTS

| | | |
|---|---|---|
| CN | 101863673 A | 10/2010 |
| CN | 102674866 A | 9/2012 |
| CN | 202684062 U | 1/2013 |
| CN | 103274711 A | 9/2013 |
| CN | 105036778 A | 11/2015 |
| CN | 105130471 A | 12/2015 |
| CN | 105565794 A | 5/2016 |
| JP | 2001158661 A | 6/2001 |

OTHER PUBLICATIONS

Lin Yuan et al., Green refractory, China building materials industry press, 2015, pp. 86.

Xiaohai Xu et. al., Technical manual of refractory materials, 2000, pp. 202, Metallurgical Industry Press.

Lin Yuan et al., Green refractory, 2015, pp. 86, China building materials industry press.

* cited by examiner

MANUFACTURING METHOD OF MAGNESIUM-ALUMINIUM SPINEL BRICK AND MAGNESIUM-ALUMINIUM SPINEL BRICK MANUFACTURED BY THE METHOD

CROSS REFERENCE TO THE RELATED APPLICATIONS

This application is the national phase entry of International Application No. PCT/CN2016/110249, filed on Dec. 16, 2016, which is based upon and claims priority to Chinese Patent Application No. 201510936752.3, filed on Dec. 16, 2015, the entire contents of which are incorporated herein by reference.

TECHNICAL FIELD

The present invention belongs to a field of refractory materials, specifically, relates to a manufacturing method of a low heat-conducting magnesium-aluminium spinel brick and a low heat-conducting magnesium-aluminium spinel brick manufactured by employing the manufacturing method.

BACKGROUND

As is well known, a rotary kiln is one of main apparatuses in a process of producing cement, quicklime, etc.

Taking the production of cement as an example:

There are two important technological breakthroughs in the beginning of the 20th century. The first one is that the rotary kiln was fully popularized in the beginning of the 20th century, and the second one is the appearance of the pre-calcining technology. They greatly improve the thermal efficiency and the single machine production capacity of the cement kiln, help the cement industry develop to be large-scale and modernized, and accordingly also greatly help the development of refractory materials accompanying the cement industry. From the beginning of the last century to the 50s, clay, high-alumina refractory materials are used for the production and development of conventional rotary kilns which are mainly wet process kilns. After the 50s, on the basis of further improving the performance of the above mentioned materials, magnesia refractory materials appeared successively to adapt to the development of the suspension preheater, the precalcining kiln technology, and were continually improved with the development of the precalcining kiln technology.

At present, the configuration of refractory materials of the domestic cement rotary kiln is shown in FIG. 1.

The configuration of refractory materials for the domestic cement rotary kiln is (in the order of a preheating zone to a burning zone) basically: anti-strip high aluminium brick/silicon mullite bricks, magnesium-aluminium spinel bricks/silicon mullite bricks, magnalium-iron-alluminium spinel bricks/pleonastes, magnesium-aluminium spinel bricks/silicon mullite red bricks etc.

Magnesium-aluminium spinel bricks or silicon mullite red bricks commonly used in a transition zone are laid. However, because the shell temperature for laying magnesium-aluminium spinel bricks is comparatively high, silicon mullite bricks are also often used in the transition zone of the domestic rotary kiln. In comparison with the magnesium-aluminium spinel brick, the thermal conductivity of the silicon mullite brick is low to some extent.

With regarding to thermal conductivity of refractory materials for the rotary kiln, indices listed by domestic enterprises as well as relevant data of domestic literatures are not strict. In many cases, only data of thermal conductivity is noted, and temperature limits are not noted. Therefore, Zibo City Luzhong Refractories Co., Ltd. entrusts the National Institute of Building Materials to test the anti-strip high aluminium brick, the silicon mullite brick and the magnesium-aluminium spinel currently used in the rotary kiln for coefficients of thermal conductivity at 350° C., 700° C. respectively, indices of which are as shown in Table 1.

TABLE 1 coefficients of thermal conductivity of some materials used for a rotary kiln

| test item | unit | anti-strip high aluminium brick | silicon mullite brick | magnesium-aluminium spinel brick |
|---|---|---|---|---|
| coefficient of thermal conductivity at 350° C. | W/m · k | 1.972 | 2.861 | 3.822 |
| coefficient of thermal conductivity at 700° C. | W/m · k | 1.868 | 2.723 | 3.713 |

As is seen from Table 1, though the coefficient of thermal conductivity of the silicon mullite brick is very low in comparison with the magnesium-aluminium spinel brick, the coefficients of thermal conductivity of the magnesium-aluminium spinel brick and the silicon mullite brick are still comparatively high. The coefficient of thermal conductivity of the refractory material is comparatively high and the thermal loss of the kiln shell is large, which is one of the factors which lead to comparatively high thermal loss of cement clinker.

The cement kiln transition zone is a zone where the use condition of the refractory material in the cement rotary kiln is the most harsh. In this zone, the temperature changes frequently, the flame comes in and out, the kiln coating attaches and detaches, kiln liner materials are often in a state in which they are not protected by the kiln coating, directly exposing to high temperature radiation and thermal current scour. Therefore, the kiln liner materials in this zone suffer from chemical erosion caused by clinker and alkali compounds, thermal shock scaling of the materials due to the thermal stress caused by the temperature change, scour wear of the materials and mechanical stress of mechanical vibration. Therefore, the low heat-conducting refractory material for the transition zone must first have good high temperature performance, such as erosion resistance, scour resistance, thermal shock resistance, mechanical stress resistance, and on this basis, it should have a coefficient of thermal conductivity which is as low as possible.

At present, the main materials used in the transition zone of the rotary kiln in foreign countries are basically magnesium-aluminium spinel brick, such as ANKRAL-RE of RHI Company. Although performance of these materials is well suitable for use conditions of the transition zone, the coefficient of thermal conductivity thereof is very high, the coefficient of thermal conductivity at 500° C. is up to 4.3 W/m·k. This is also a very important factor which restricts the application of the magnesium-aluminium spinel brick. In order to reduce the shell temperature, in our country, silicon mullite brick or silicon mullite red brick are in more cases used in the transition zone, whose indices are listed in Table 2 (cited from literatures). Although the shell temperature of silicon mullite brick is relatively low, performance thereof can difficultly be adapted to the working condition of the transition zone.

TABLE 2 physicochemical indices of silicon mullite brick and silicon mullite red brick

| serial number | product model | Al$_2$O$_3$ (%) | | apparent porosity (%) | volume density (g/cm$^3$) | compressive resistance (MPa) | refractoriness underload (° C.) | thermal shock stability (1100° C., times) | wearing coefficien (cm$^3$) | thermal conductivity (W/mK) |
|---|---|---|---|---|---|---|---|---|---|---|
| | | | SiO$_2$ + SiC (%) | | | | | | | |
| 1 | unnamed 1 | 61.85 | 36 | 19 | — | 85 | 1650 | 24 | — | — |
| 2 | HMS-1680 | 65 | | | 2.65 | 85 | 1650 | 10 | 7.8 | 2.3 |
| | HMS-1650 | 63 | | | 2.60 | 90 | 1600 | 12 | 8.2 | 2.5 |
| | HMS-1550 | 60 | | | 2.55 | 75 | 1550 | 12 | 9.2 | |
| | HMS-1450 | 58 | | | 2.50 | 70 | 1450 | 10 | 9.9 | |
| | | | SiO$_2$ | | | | | | | |
| 3 | KBN-1 | 75 | 5 | 18 | 2.95 | 9.0 | 1450 | >46 | | <2.4 |
| | KBN-11 | 80 | 10 | 18 | 3.00 | 9.0 | 1500 | >46 | | <2.4 |

The silicon mullite brick is a refractory material manufactured by using silicon carbide and bauxite as raw materials. The silicon carbide is introduced due to its good alkalinous errosion resistance. However, under the use temperature, silicon carbide is prone to be oxidized into SiO$_2$. Therefore, the amount of silicon carbide that exists in the hot face of the silicon mullite brick (i.e. the hot face end contacting with cement materials) is very small. That is, the hot face of the silicon mullite brick is actually an Al$_2$O$_3$—SiO$_2$ system. However, the use of the material of the Al$_2$O$_3$—SiO$_2$ system in the transition zone has its weakness, as shown in FIG. 2.

As is seen from FIG. 2, chemical compositions are located at an Al$_2$O$_3$-rich end of the Al$_2$O$_3$—SiO$_2$ side. With increase in the amount of reaction with CaO, liquid phase content thereof increases continually. That is, liquid phase is generated as long as they contact CaO. Moreover, with the generation of liquid phase, chemical reaction thereof becomes more adequate. This is why the silicon mullite brick is damaged very quickly and very seriously, when the silicon mullite brick is used in the transition zone, only if the temperature is comparatively high and liquid phase is generated.

By contrast, applicability and durability under a condition that a magnesium-aluminium spinel brick based on the MgO—Al$_2$O$_3$ system contacts CaO are much better, which can be seen from the phase diagram in FIG. 3.

In addition, the temperature of the transition zone is comparatively high, all of alkali metal salt is basically in a liquid phase state, their penetration depth in materials are comparatively large, erosion of the silicon mullite brick by the alkali metal is very harsh, which also causes the silicon mullite brick not to have the applicability of the magnesium-aluminium spinel brick.

With development and progress of the industry, the cement rotary kiln functions as the optimal environment for cooperative processing, the cooperative processing range of the cement rotary kiln will become more and more wide. Therefore, this also results in more and more frequent fluctuation of the atmosphere within the kiln, the volatile salt concentration, the alkali sulfate ratio etc, and the applicability of materials will become more and more critical.

Based on the above mentioned factors, this technological invention is based on the magnesium-aluminium spinel system. By compounding of materials, performance of materials is controlled, and effective reduction of the coefficient of thermal conductivity is achieved. Moreover, the obtained magnesium-aluminium spinel brick includes a high pure magnesium-aluminium spinel material flame retardant coating and a magnesium-iron composite olivine material thermal insulating layer, has good service performance such as high temperature scour resistance, erosion resistance, and a low coefficient of thermal conductivity, is applicable to the cement rotary kiln, the quicklime rotary kiln and various high temperature kilns, to obtain effects of a long service life and energy saving.

In the following, the status of the prior art is listed.

ChangHe Gao et al. have developed "Magnesia-Alumina Spinel Brick with High Strength and Low Conductivity (CN201310240755)". Its raw materials are as follows: magnesium-aluminium synthetic material of granularity 5 mm-3 mm 20%-25%, magnesium-aluminium synthetic material of granularity 3 mm-1 mm 20%-25%, fused magnesia of granularity 1 mm-0 mm 12%-16%, fused magnesia of granularity 180 F 12%-16%, magnesium-aluminium synthetic material of granularity 180 F 10%-12%, fused magnesium-aluminium spinel of granularity 180 F 4%-8%, α-Al$_2$O$_3$ powder 2%-5%, plus calcium lignosulphonate which is 3.5%-5% of total weight of the above mentioned raw materials. The coefficient of thermal conductivity of the brick is 1.7 W/(m·° C.)-2.2 (W/m·° C.). This technical solution employs a single material. The employed raw material is mainly a light weight magnesium-aluminium synthetic material. The sintering temperature of the manufacture is low, the high temperature performance, the erosion resistance and the penetration resistance performance are reduced, thereby affecting the service life of the manufacture.

JiaBang Wang et al. have developed "Magnesia-Alumina Spinel Structure Heat Insulation Integrated Composite Brick and Preparation Method Thereof (CN201010192161)". It includes a dense heavy weight flame retardant coating of the magnesium-aluminium spinel as well as a light weight thermal insulating layer which uses aluminum oxide hollow balls or aluminium-magnesium hollow balls or corundum hollow balls or a mixture of these three kinds of hollow balls as light weight aggregate. It adopts shock compression or machine moulding. The proportion of lengths of the heavy weight flame retardant coating and the light weight thermal insulating layer 1-5:2-1. This invention overcomes the defect that the magnesium-aluminium spinel brick for the rotary kiln has a large coefficient of thermal conductivity. It provides an integrally thermal insulating composite brick of the magnesium-aluminium spinel structure with good wear resistance, high fire resistance, large structural strength and good thermal insulating performance. The coefficient of thermal conductivity of said magnesium-aluminium spinel flame retardant coating is: 2.7 W/(m·K)-3.9 W/(m·K); the coefficient of thermal conductivity of said light weight thermal insulating layer is: 0.6 W/(m·K)-1.3 W/(m·K); the bonding face of the magnesium-aluminium spinel flame retardant coating and the light weight thermal insulating layer is a plane. This technical solution adopts a composite structure of a flame retardant coating and a thermal insulating layer, but the bonding face is a plane, wherein the flame retardant coating thereof is a dense magnesium-aluminium spinel material, the thermal insulating layer is a material of aluminum oxide hollow balls or aluminium-magnesium hollow balls or corundum hollow balls or a mixture of these three kinds of hollow balls as light weight aggregate. The flame retardant coating and the thermal insulating layer have a significant difference in the raw material performance, both raw materials also have a significant difference in the sintering temperature, such that the linear expansivities of the flame retardant coating and the thermal insulating layer are not consistent and the high-temperature strength of the boding interface is comparatively low, a rupture phenomenon is very easy to occur, and it is difficult to guarantee the normal use.

JieZeng Wang et al. have developed "Periclase-Magnesia-Alumina Spinel Composite Refractory Brick and Production Process Thereof (CN200810146977)". The mixing ratio thereof is: ① flame retardant coating: 5 mm-1 mm magnesia 29%-48%, 3 mm-1 mm magnesium-aluminium spinel 7%-16%, 1 mm-0.088 mm magnesia 6%-20%, 0.4 mm-0.088 mm desilicated zirconium granule 0-4%, ≤0.088 mm magnesia 16%-25%, ≤0.020 mm magnesia micro powder 0-10%, ≤0.020 mm desilicated zirconium micro powder 0-5%, ≤0.020 mm calcium carbonate micro powder 0-3%, ≤0.020 mm lanthanum oxide micro powder 0-6%, plus water reducing agent (sulfonated naphthalene formaldehyde polymer+sulfonated melamine polymer+polycarboxylic acid or sodium salt thereof) 0-0.3%; ② thermal insulating layer: 3.2 mm-1.0 mm magnesia 0-20%, 3.2 mm-1.0 m forsterite 35%-45%, 1.0 mm-0.088 mm magnesia 5%-15%, 1.0 mm-0.088 mm forsterite 5%-15%, ≤0.088 mm co-milled powder of agnesia and forsterite 30%-40%. The bonding face of the flame retardant coating and the thermal insulating layer of this composite brick is sawtooth-shaped. By examination, the coefficient of thermal conductivity of the flame retardant coating is: 3.7 W/(m·K)-3.8 W/(m·K), the coefficient of thermal conductivity of the thermal insulating layer is 1.6 W/(m·K)-1.8 W/(m·K). Although this technical solution adopts a composite structure of a flame retardant coating and a thermal insulating layer, the flame retardant coating thereof adopts extra micro powder. This reduces the sintering temperature of the flame retardant coating such that the high temperature performance such as the refractoriness under load of the flame retardant coating is reduced. Therefore, it is difficult to satisfy the working condition of the transition zone of the cement kiln.

NAZIRIZADEH MORTEZA et al. have developed "Magnesia and spinel refractory brick (U.S. Pat. No. 4,729,974)". A magnesium-aluminium spinel refractory brick includes sintered magnesium oxide and magnesium-aluminium spinel as well as dopants which may be up to 3%. Said dopants are calcium oxide, iron oxide, silicon oxide. This refractory brick may withstand a high temperature of 1740° C., and is especially applicable to the cement rotary kiln.

HARAGUCHI JUNICHI et al. have developed "ALUMINA-MAGNESIA REFRACTORY BRICK (JP2001158661)". A magnesium-aluminium refractory brick has an apparent porosity no more than 13%, and has excellent slag errosion resistance. This refractory brick includes 1 to 2 kinds of spinel clinker and magnesium oxide clinker.

SUMMARY

The present invention provides a manufacturing method of a low heat-conducting magnesium-aluminium spinel brick and a low heat-conducting magnesium-aluminium spinel brick manufactured by employing the method. This magnesium-aluminium spinel brick has a high pure magnesium-aluminium spinel material flame retardant coating and a magnesium-iron composite olivine material thermal insulating layer. By adjusting the formula of the thermal insulating layer, a low coefficient of thermal conductivity and consistency of linear expansivity of the flame retardant coating and the thermal insulating layer are guaranteed, the sintering temperature of the thermal insulating layer is increased and made match the flame retardant coating.

Technical Solution a manufacturing method of a magnesium-aluminium spinel brick, wherein the magnesium-aluminium spinel brick includes a flame retardant coating and a thermal insulating layer, the manufacturing method of the magnesium-aluminium spinel brick includes specific manufacturing steps as follows:

step (1) a preparation of flame retardant coating raw materials using the following components by mass percent, evenly mixing 40%-70% of sintered magnesia having a granularity ≤5 mm, 10%-40% of fused magnesia having a granularity ≤3 mm, 10%-20% of magnesium-aluminium spinel having a granularity ≤4 mm, and 0%-40% (excluding 0%) of corundum having a granularity ≤2 mm to prepare flame retardant coating raw material mixed powder, then additionally adding 1%-5% of naphthalene binder by taking the flame retardant coating raw material mixed powder as a basis, for an even mixing to prepare the flame retardant coating raw materials;

step (2) a preparation of thermal insulating layer raw materials using the following components by mass percent, evenly mixing 40%-60% of forsterite, 10%-40% of fayalite, and 10%-50% of magnesia to obtain mixed powder, adding 1%-5% of naphthalene binder by taking the mixed powder as a basis to obtain a mixed material, moulding the mixed material by a frictional press, drying the mixed material at 110° C.-150° C., and then burning the mixed material at a temperature of above 1000° C. to obtain aggregate composite hortonolite raw materials;

taking aggregate composite hortonolite having a granularity ≤5 mm from the aggregate composite hortonolite raw materials as a single raw material, adding 1%-5% of naphthalene binder to the aggregate composite hortonolite having the granularity ≤5 mm for an even mixing to prepare the thermal insulating layer raw materials; and step (3) spacing and loading the flame retardant coating raw materials and the thermal insulating layer raw materials in a mold by using corrugated thin iron sheets, pressing the flame retardant coating raw materials and the thermal insulating layer raw materials into green bricks by a press machine, keeping the green bricks at a temperature of 110° C. for 24 hours, drying the green bricks, and burning the green bricks into the magnesium-aluminium spinel brick at a temperature of 1550° C.-1750° C. in a tunnel kiln; wherein a sequence of the step (1) and the step (2) allows to be inversed.

Furthermore, step (1) the preparation of the flame retardant coating raw materials using the following components by mass percent, evenly mixing 45%-70% of sintered magnesia having the granularity ≤5 mm, 15%-40% of fused magnesia having the granularity ≤3 mm, 10%-20% of magnesium-aluminium spinel having the granularity ≤4 mm, and 0%-10% (excluding 0%) of corundum having the granularity ≤2 mm to prepare the flame retardant coating raw material mixed powder, then additionally adding 2%-5% of naphthalene binder by taking the flame retardant coating raw material mixed powder as a basis for an even mixing to prepare the flame retardant coating raw materials;

step (2) the preparation of the thermal insulating layer raw materials using the following components by mass percent, evenly mixing 50%-60% of forsterite, 20%-30% of fayalite, and 20%-30% of magnesia to obtain the mixed powder, adding 2%-5% of naphthalene binder by taking the mixed powder as a basis to obtain the mixed material, moulding the mixed material by the frictional press, drying the mixed material at 110° C.-150° C., burning the mixed material at the high temperature of above 1000° C. to obtain the aggregate composite hortonolite raw materials; and taking the aggregate composite hortonolite having the granularity ≤5 mm from the aggregate composite hortonolite raw materials as a single raw material, adding 2%-5% of naphthalene binder to the aggregate composite hortonolite having the granularity ≤5 mm for an even mixing to prepare the thermal insulating layer raw materials.

Furthermore, in the step (2), the step of taking the aggregate composite hortonolite having the granularity ≤5 mm from the aggregate composite hortonolite raw materials as a single raw material includes: taking 65%-75% (mass percent content) of a first aggregate composite hortonolite having the granularity ≤5 mm and 25-35% (mass percent content) of a second aggregate composite hortonolite having a granularity ≤0.088 mm as the single raw material.

Furthermore, a mass percent content of the aggregate composite hortonolite having the granularity ≤5 mm is 67%-70%, and a mass percent content of the aggregate composite hortonolite having the granularity ≤0.088 mm is 30%-33%.

Furthermore, the mass percent content of the aggregate composite hortonolite having the granularity ≤5 mm is 67%, accordingly the mass percent content of the aggregate composite hortonolite having the granularity ≤0.088 mm is 33%; or the mass percent content of the aggregate composite hortonolite having the granularity ≤5 mm is 68%, accordingly the mass percent content of the aggregate composite hortonolite having the granularity ≤0.088 mm is 32%; or the mass percent content of the aggregate composite hortonolite having the granularity ≤5 mm is 70%, accordingly the mass percent content of the aggregate composite hortonolite having the granularity ≤0.088 mm is 30%.

Furthermore, the naphthalene binder is naphthalene sulfonate formaldehyde condensate.

Furthermore, in the flame retardant coating raw materials:

a mass percent content of MgO in the sintered magnesia is above 96.5%; a mass percent content of MgO in the fused magnesia is above 97%; the magnesium-aluminium spinel is sintered magnesium-aluminium spinel or fused magnesium-aluminium spinel, a mass percent content of $Al_2O_3$ in the sintered magnesium-aluminium spinel is 66%-73%, a mass percent content of $Al_2O_3$ in the fused magnesium-aluminium spinel is 70%-75%; a mass percent content of $Al_2O_3$ in the corundum is above 99%;

in the thermal insulating layer raw materials:

a mass percent content of MgO in the forsterite is 62%-67% and a mass percent content of $SiO_2$ in the forsterite is 25%-30%; a mass percent content of FeO in the fayalite is 48%-53% and a mass percent content of $SiO_2$ in the fayalite is 41%-46%; the magnesia is sintered magnesia or fused magnesia, a mass percent content of MgO in the sintered magnesia is above 96.5%, a mass percent content of MgO in the fused magnesia is above 97%.

The present invention also provides a magnesium-aluminium spinel brick, the magnesium-aluminium spinel brick is manufactured by the aforementioned manufacturing method.

In comparison with the prior art, advantages of the present patent of invention are:

1. The low heat-conducting magnesium-aluminium spinel brick includes a flame retardant coating and a thermal insulating layer, the flame retardant coating is high pure magnesium-aluminium spinel, the thermal insulating layer is magnesium-iron composite olivine. The flame retardant coating reserves good high temperature mechanical behavior such as erosion resistance, scour resistance, thermal shock resistance, mechanical stress resistance, which the magnesium-aluminium spinel brick has, for the hot face (the working face), but the coefficient of thermal conductivity is comparatively high, thermal loss is comparatively large; whereas the thermal insulating layer has a coefficient of thermal conductivity lower than that of the flame retardant coating, while reserving good high temperature mechanical behavior of the flame retardant coating.

2. The thermal insulating layer is a composite of forsterite and fayalite. Fayalite is solid solute in forsterite to form hortonolite solid solution which takes forsterite as main crystalling phase. There is no crystal shape change from the room temperature to the 1890° C. melting point, volumetric stability is good in use, the coefficient of thermal conductivity is low.

3. Because fayalite is solid solute in forsterite, coefficients of thermal expansion of the thermal insulating layer and the flame retardant coating achieve moderate transition, such that the flame retardant coating and the thermal insulating layer which are two kinds of materials having different properties can be bonded firmly. Strengths of the magnesium-aluminium spinel, the hortonolite as well as their bonding spot are very close to each other.

4. The formula of the thermal insulating layer of the present invention can increase the sintering temperature of the thermal insulating layer, make it match the flame retardant coating, such that consistency of linear expansivity of the flame retardant coating and the thermal insulating layer is guaranteed. As such, on the premise that service performance is guaranteed, reduction in the coefficient of thermal conductivity is achieved.

5. In comparison with the ordinary magnesium-aluminium spinel brick and the silicon mullite brick, the low heat-conducting magnesium-aluminium spinel brick manufactured by the present invention reduce loads and mechanical stress of the cement rotary kiln body, improves thermal insulating layer stripping resistance, has a long service life. The heat conducting capability of the cement rotary kiln body is reduced, the shell temperature is low, thermal loss is greatly reduced. It is the ideal material of the current cement rotary kiln transition zone.

6. In this method, naphthalene binder such as naphthalene sulfonate formaldehyde condensate is used. It has a good dispersion effect, does not introduce air, has a small effect on the setting time of materials, has a high semifinished product moulding strength. The most important characteristic is that it is alkalinous and does not react with alkalinous refractory materials.

DETAILED DESCRIPTION OF THE EMBODIMENTS

Figure 1:
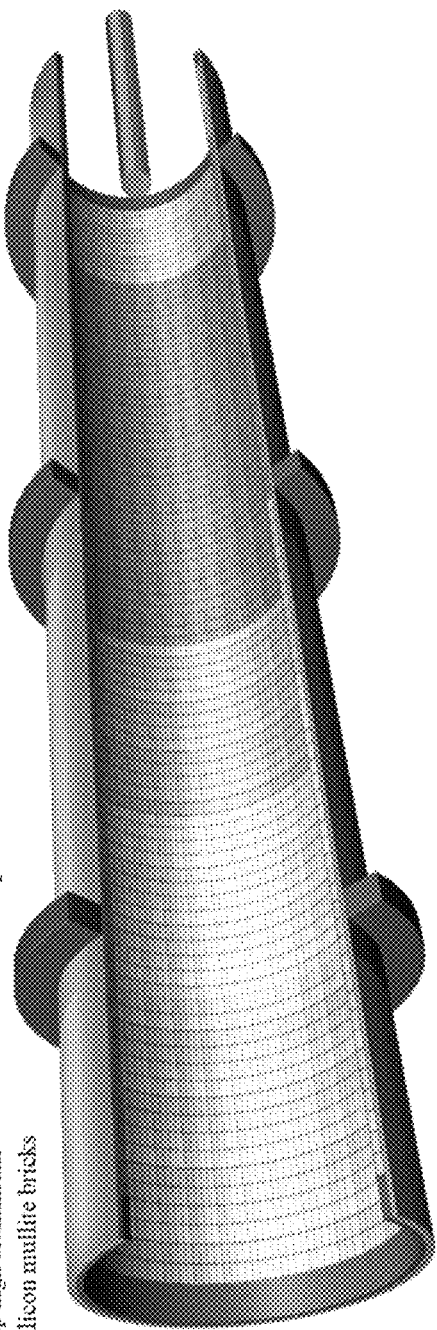
FIG. 1 is the configuration of refractory materials of a domestic cement rotary kiln.
Figure 2:
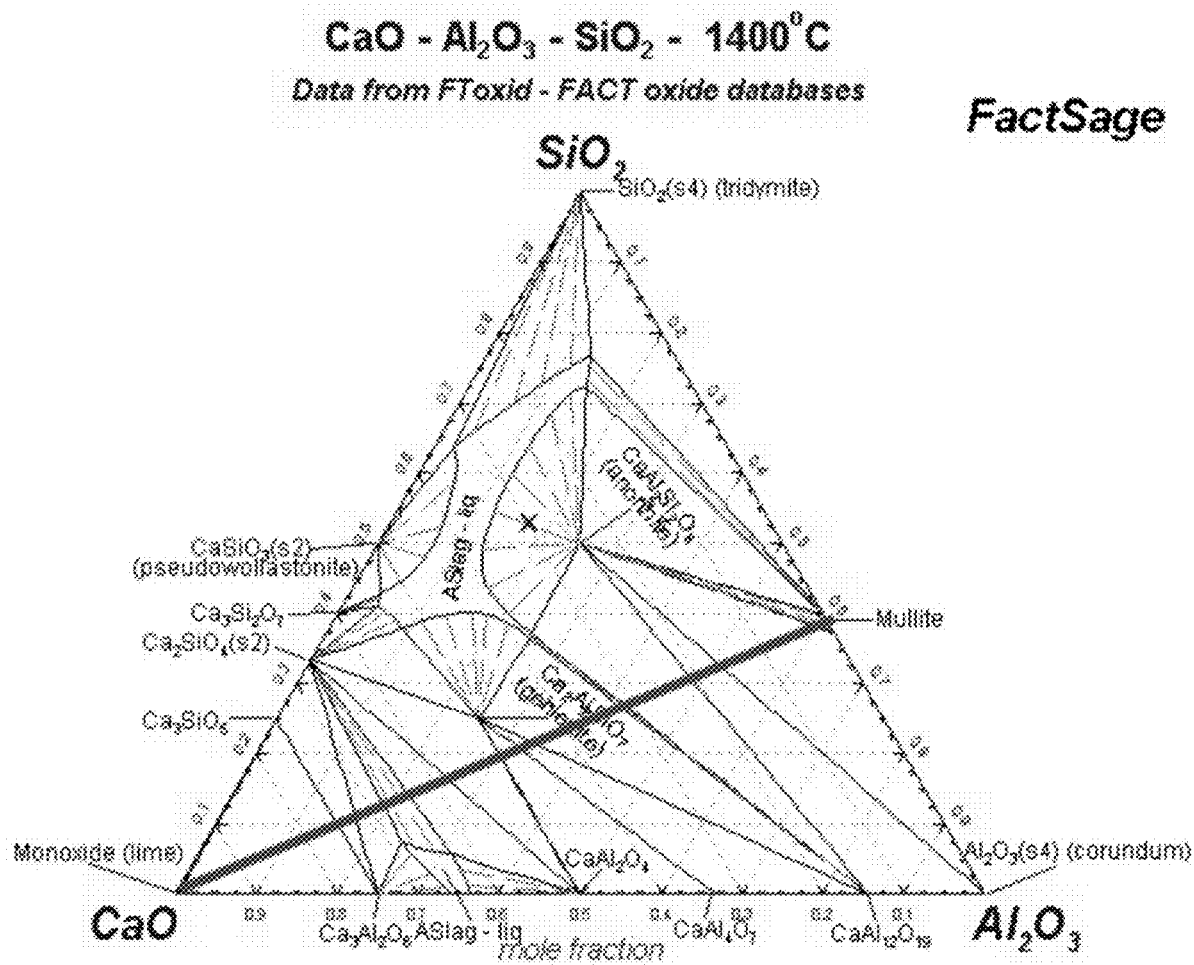
FIG. 2 is an $Al_2O_3$—$SiO_2$—$CaO$ system phase diagram.
Figure 3:
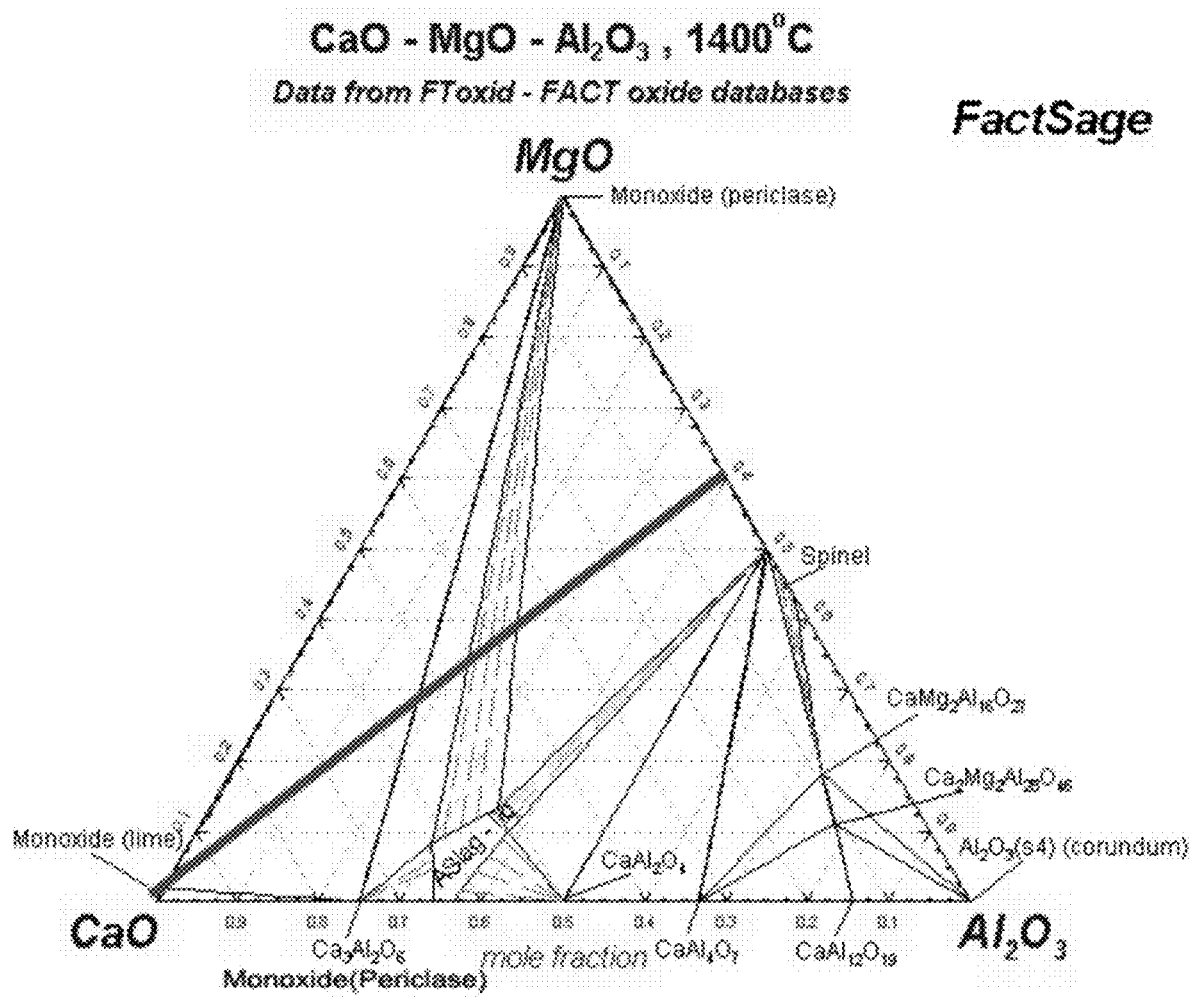
FIG. 3 is a $MgO$—$Al_2O_3$—$CaO$ system phase diagram.

In the following embodiments, a naphthalene binder employs naphthalene sulfonate formaldehyde condensate. The use of naphthalene binder improves the dispersion effect of the binder, does not introduce air, has a small effect on the setting time of materials, has a high semifinished product moulding strength. The most important characteristic is that it is alkalinous and does not react with alkalinous refractory materials.

In the following embodiments, in the flame retardant coating raw materials:
the mass percent content of MgO in adopted sintered magnesia is above 96.5%; the mass percent content of MgO in adopted fused magnesia is above 97%; magnesium-aluminium spinel may adopt sintered magnesium-aluminium spinel or fused magnesium-aluminium spinel, and if the sintered magnesium-aluminium spinel is adopted, the mass percent content of $Al_2O_3$ in sintered magnesium-aluminium spinel is 66%-73%, and if the fused magnesium-aluminium spinel is adopted, the mass percent content of $Al_2O_3$ in fused magnesium-aluminium spinel is 70%-75%; the mass percent content of $Al_2O_3$ in adopted corundum is above 99%;

in the thermal insulating layer raw materials:
the mass percent content of MgO in adopted forsterite is 62%-67% and the mass percent content of $SiO_2$ is 25%-30%; the mass percent content of FeO in adopted fayalite is 48%-53% and the mass percent content of $SiO_2$ is 41%-46%; magnesia may adopt sintered magnesia or fused magnesia, and if the sintered magnesia is adopted, the mass percent content of MgO in sintered magnesia is above 96.5%, and if the fused magnesia is adopted, the mass percent content of MgO in fused magnesia is above 97%.

Embodiment 1

The present embodiment provides a manufacturing method of a magnesium-aluminium spinel brick and a magnesium-aluminium spinel brick manufactured by employing the method. The magnesium-aluminium spinel brick includes a flame retardant coating and a thermal insulating layer. Specific manufacturing steps are as follows:
(1) preparation of flame retardant coating raw materials: contents of respective components are expressed in mass percent,
sintered magnesia, granularity is ≤5 mm, accounts for 45% of total amount;
magnesium-aluminium spinel, granularity is ≤4 mm, accounts for 10% of total amount fused magnesia, granularity is ≤3 mm, accounts for 40% of total amount;
corundum, granularity is ≤2 mm, accounts for 5% of total amount.

The above mentioned raw materials are weighted, mixed, and compounded by the naphthalene binder to manufacture flame retardant coating raw materials of the low heat-conducting magnesium-aluminium spinel brick. The amount of the added naphthalene binder is 1%-5% (mass percent) by taking the above mentioned mixed powder as a basis. Preferably, the amount of the added naphthalene binder is 2%-5% by taking the above mentioned mixed powder as a basis. In the present embodiment, the amount of the added naphthalene binder is 2% by taking the above mentioned mixed powder as a basis.

(2) preparation of thermal insulating layer raw materials: contents of respective components are expressed in mass percent,
forsterite which accounts of 40%-60% of the total amount, fayalite which accounts of 10%-40% of the total amount, magnesia which accounts of 10%-50% of the total amount are selected to be evenly mixed, additional 1%-5% naphthalene binder is added by taking mixed powder as a basis, they are moulded by a frictional press, dried at 110° C.-150° C., burned at a high temperature above 1000° C. to obtain aggregate composite hortonolite raw materials; specifically, in the present embodiment, forsterite which accounts of 50% of the total amount, fayalite which accounts of 20% of the total amount, magnesia which accounts of 30% of the total amount are evenly mixed, 1%-5% naphthalene binder is added by taking mixed powder as a basis, they are moulded by a frictional press, dried at 110° C.-150° C., burned at a high temperature above 1000° C. to obtain aggregate composite hortonolite raw materials; wherein the amount of the added naphthalene binder is 1%-5% by taking the above mentioned mixed powder as a basis; preferably, the amount of the added naphthalene binder is 2%-5% by taking the above mentioned mixed powder as a basis; in the present embodiment, the amount of the added naphthalene binder is 2% by taking the above mentioned mixed powder as a basis.

Mass of a portion, which has granularity ≤5 mm, of the above mentioned manufactured aggregate composite hortonolite raw material is made account for 67% of the total amount, mass of a portion which has granularity ≤0.088 mm is made account for 33% of the total amount, then 1%-5% naphthalene binder is additionally added by taking the aggregate composite hortonolite raw material as a basis, thermal insulating layer raw materials are prepared after evenly mixing; preferably, here, the amount of the added naphthalene binder is 2%-5% by taking the aggregate composite hortonolite raw material as a basis; in the present embodiment, the amount of the added naphthalene binder is 2% by taking the aggregate composite hortonolite raw material as a basis.

(3) the above mentioned flame retardant coating raw material and thermal insulating layer raw material are spaced and loaded in a mold by using corrugated thin iron sheets, pressed into green bricks by a press machine after the thin iron sheets are removed, kept at a temperature of 110° C. for 24 hours, dried, and burned into low heat-conducting magnesium-aluminium spinel bricks at a temperature of 1710° C. in a tunnel kiln.

wherein the sequence of step (1) and step (2) is irrelevant.

After the above mentioned three steps, the low heat-conducting magnesium-aluminium spinel brick is obtained.

Embodiment 2

The present embodiment provides a manufacturing method of a magnesium-aluminium spinel brick and a magnesium-aluminium spinel brick manufactured by employing the method, which may be used for a transition zone of a cement kiln. The magnesium-aluminium spinel brick includes a flame retardant coating and a thermal insulating layer. Specific manufacturing steps are as follows:

(1) preparation of flame retardant coating raw materials: contents of respective components are expressed in mass percent, sintered magnesia, granularity is ≤5 mm, accounts for 60% of total amount;

magnesium-aluminium spinel, granularity is ≤4 mm, accounts for 10% of total amount;

fused magnesia, granularity is ≤3 mm, accounts for 25% of total amount;

corundum, granularity is ≤2 mm, accounts for 5% of total amount.

The above mentioned raw materials are weighted, mixed, and compounded by the naphthalene binder to manufacture flame retardant coating raw materials of the low heat-conducting magnesium-aluminium spinel brick. The amount of the added naphthalene binder is extra 1%-5% by taking the above mentioned mixed powder as a basis. Preferably, here, the amount of the added naphthalene binder is extra 2%-5% by taking the above mentioned mixed powder as a basis; in the present embodiment, the amount of the added naphthalene binder is 3% by taking the above mentioned mixed powder as a basis.

(2) preparation of thermal insulating layer raw materials: contents of respective components are expressed in mass percent, forsterite 40%-60%, fayalite 10%-40%, magnesia 10%-50% are selected to be evenly mixed, 1%-5% naphthalene binder is added by taking mixed powder as a basis, they are moulded by a frictional press, dried at 110° C.-150° C., burned at a high temperature above 1000° C. to obtain aggregate composite hortonolite raw materials; specifically, in the present embodiment, forsterite which accounts of 55% of the total amount, fayalite which accounts of 25% of the total amount, magnesia which accounts of 20% of the total amount are evenly mixed, 1%-5% naphthalene binder is added by taking the mixed powder as a basis, they are moulded by a frictional press, dried at 110° C.-150° C., burned at a high temperature above 1000° C. to obtain aggregate composite hortonolite raw materials; wherein the amount of the added naphthalene binder is 1%-5% by taking the above mentioned mixed powder as a basis; preferably, the amount of the added naphthalene binder is 2%-5% by taking the above mentioned mixed powder as a basis; in the present embodiment, the amount of the added naphthalene binder is 3% by taking the above mentioned mixed powder as a basis.

A portion, which has granularity ≤5 mm, of the above mentioned manufactured aggregate composite hortonolite raw material is made account for 70% (mass percent) of the total amount, a portion which has granularity ≤0.088 mm is made account for 30% (mass percent) of the total amount, then 1%-5% (mass percent) naphthalene binder is additionally added by taking the aggregate composite hortonolite raw material as a basis, thermal insulating layer raw materials are prepared after evenly mixing; preferably, here, the amount of the added naphthalene binder is 2%-5% by taking the aggregate composite hortonolite raw material as a basis; in the present embodiment, the amount of the added naphthalene binder is 3% by taking the aggregate composite hortonolite raw material as a basis.

(3) the above mentioned flame retardant coating raw material and thermal insulating layer raw material are spaced and loaded in a mold by using corrugated thin iron sheets, pressed into green bricks by a press machine after the thin iron sheets are removed, kept at a temperature of 110° C. for 24 hours, dried, and burned into low heat-conducting magnesium-aluminium spinel bricks at a temperature of 1630° C. in a tunnel kiln.

wherein the sequence of step (1) and step (2) is irrelevant.

After the above mentioned three steps, the low heat-conducting magnesium-aluminium spinel brick is obtained.

Embodiment 3

The present embodiment provides a manufacturing method of a magnesium-aluminium spinel brick and a magnesium-aluminium spinel brick manufactured by employing the method, which may be used for a transition zone of a cement kiln. The magnesium-aluminium spinel brick includes a flame retardant coating and a thermal insulating layer. Specific manufacturing steps are as follows:

(1) preparation of flame retardant coating raw materials: contents of respective components are expressed in mass percent, sintered magnesia, granularity is ≤5 mm, accounts for 68% of total amount;

magnesium-aluminium spinel, granularity is ≤4 mm, accounts for 10% of total amount;

fused magnesia, granularity is ≤3 mm, accounts for 19% of total amount;

corundum, granularity is ≤2 mm, accounts for 3% of total amount.

The above mentioned raw materials are weighted, mixed, and compounded by the naphthalene binder to manufacture flame retardant coating raw materials of the low heat-conducting magnesium-aluminium spinel brick. The amount of the added naphthalene binder is 1%-5% by taking the above mentioned mixed powder as a basis. Preferably, the amount of the added naphthalene binder is 2%-5% by taking the above mentioned mixed powder as a basis, in the present embodiment, the amount of the added naphthalene binder is 3% by taking the above mentioned mixed powder as a basis.

(2) preparation of thermal insulating layer raw materials: contents of respective components are expressed in mass percent, forsterite 40%-60%, fayalite 10%-40%, magnesia 10%-50% are selected to be evenly mixed, 1%-5% naphthalene binder is added by taking the mixed powder as a basis, they are moulded by a frictional press, dried at 110° C.-150° C., burned at a high temperature above 1000° C. to obtain aggregate composite hortonolite raw materials; specifically, in the present embodiment, forsterite which accounts of 40% of the total amount, fayalite which accounts of 40% of the total amount, magnesia which accounts of 20% of the total amount are evenly mixed, 1%-5% naphthalene binder is added by taking the mixed powder as a basis, they are moulded by a frictional press, dried at 110° C.-150° C., burned at a high temperature above 1000° C. to obtain aggregate composite hortonolite raw materials; wherein the amount of the added naphthalene binder is 1%-5% by taking the above mentioned mixed powder as a basis; preferably, the amount of the added naphthalene binder is 2%-5% by taking the above mentioned mixed powder as a basis; in the present embodiment, the amount of the added naphthalene binder is 4% by taking the above mentioned mixed powder as a basis.

Mass of a portion, which has granularity ≤5 mm, of the above mentioned manufactured aggregate composite hortonolite raw material is made account for 68% of the total amount, mass of a portion which has granularity ≤0.088 mm is made account for 32% of the total amount, then 1%-5% naphthalene binder is additionally added by taking the aggregate composite hortonolite raw material as a basis, thermal insulating layer raw materials are prepared after evenly mixing; preferably, here, the amount of the added naphthalene binder is 2%-5% by taking the aggregate composite hortonolite raw material as a basis; in the present embodiment, the amount of the added naphthalene binder is 5% by taking the aggregate composite hortonolite raw material as a basis.

(3) the above mentioned flame retardant coating raw material and thermal insulating layer raw material are spaced and loaded in a mold by using corrugated thin iron sheets, pressed into green bricks by a press machine after the thin iron sheets are removed, kept at a temperature of 110° C. for 24 hours, dried, and burned into low heat-conducting magnesium-aluminium spinel bricks at a temperature of 1580° C. in a tunnel kiln.

wherein the sequence of step (1) and step (2) is irrelevant.

After the above mentioned three steps, the low heat-conducting magnesium-aluminium spinel brick is obtained.

Embodiment 4

The present embodiment provides a manufacturing method of a magnesium-aluminium spinel brick and a magnesium-aluminium spinel brick manufactured by employing the method, which may be used for a transition zone of a cement kiln. The magnesium-aluminium spinel brick includes a flame retardant coating and a thermal insulating layer. Specific manufacturing steps are as follows:

(1) preparation of flame retardant coating raw materials: contents of respective components are expressed in mass percent, sintered magnesia, granularity is ≤5 mm, accounts for 40% of total amount;

magnesium-aluminium spinel, granularity is ≤4 mm, accounts for 20% of total amount;

fused magnesia, granularity is ≤3 mm, accounts for 30% of total amount;

corundum, granularity is ≤2 mm, accounts for 10% of total amount.

The above mentioned raw materials are weighted, mixed, and compounded by the naphthalene binder to manufacture flame retardant coating raw materials of the low heat-conducting magnesium-aluminium spinel brick. The amount of the added naphthalene binder is 1%-5% by taking the above mentioned mixed powder as a basis. Preferably, the amount of the added naphthalene binder is 2%-5% by taking the above mentioned mixed powder as a basis. In the present embodiment, the amount of the added naphthalene binder is 5% by taking the above mentioned mixed powder as a basis.

(2) preparation of thermal insulating layer raw materials: contents of respective components are expressed in mass percent, forsterite which accounts of 40% of the total amount, fayalite which accounts of 10% of the total amount, magnesia which accounts of 50% of the total amount are evenly mixed, 1%-5% naphthalene binder is added by taking mixed powder as a basis, they are moulded by a frictional press, dried at 110° C.-150° C., burned at a high temperature above 1000° C. to obtain aggregate composite hortonolite raw materials; wherein the amount of the added naphthalene binder is 1%-5% by taking the above mentioned mixed powder as a basis; in the present embodiment, the amount of the added naphthalene binder is 1% by taking the above mentioned mixed powder as a basis.

A portion, which has granularity ≤5 mm, of the above mentioned manufactured aggregate composite hortonolite raw material is made account for 65% (mass percent) of the total amount, a portion which has granularity ≤0.088 mm is made account for 35% (mass percent) of the total amount, then 1%-5% (mass percent) naphthalene binder is additionally added by taking the aggregate composite hortonolite raw material as a basis, thermal insulating layer raw materials are prepared after evenly mixing; preferably, here, the amount of the added naphthalene binder is 2%-5% by taking the aggregate composite hortonolite raw material as a basis; in the present embodiment, the amount of the added naphthalene binder is 5% by taking the aggregate composite hortonolite raw material as a basis.

(3) the above mentioned flame retardant coating raw material and thermal insulating layer raw material are spaced and loaded in a mold by using corrugated thin iron sheets, pressed into green bricks by a press machine after the thin iron sheets are removed, kept at a temperature of 110° C. for 24 hours, dried, and burned into low heat-conducting magnesium-aluminium spinel bricks at a temperature of 1550° C. in a tunnel kiln.

wherein the sequence of step (1) and step (2) is irrelevant.

After the above mentioned three steps, the low heat-conducting magnesium-aluminium spinel brick is obtained.

Embodiment 5

The present embodiment provides a manufacturing method of a magnesium-aluminium spinel brick and a magnesium-aluminium spinel brick manufactured by employing the method, which may be used for a transition zone of a cement kiln. The magnesium-aluminium spinel brick includes a flame retardant coating and a thermal insulating layer. Specific manufacturing steps are as follows:

(1) preparation of flame retardant coating raw materials: contents of respective components are expressed in mass percent, sintered magnesia, granularity is ≤5 mm, accounts for 50% of total amount;

magnesium-aluminium spinel, granularity is ≤4 mm, accounts for 18% of total amount;

fused magnesia, granularity is ≤3 mm, accounts for 30% of total amount;

corundum, granularity is ≤2 mm, accounts for 2% of total amount.

The above mentioned raw materials are weighted, mixed, and compounded by the naphthalene binder to manufacture flame retardant coating raw materials of the low heat-conducting magnesium-aluminium spinel brick. The amount of the added naphthalene binder is 1%-5% by taking the above mentioned mixed powder as a basis. Preferably, the amount of the added naphthalene binder is 2%-5% by taking the above mentioned mixed powder as a basis, in the present embodiment, the amount of the added naphthalene binder is 3% by taking the above mentioned mixed powder as a basis.

(2) preparation of thermal insulating layer raw materials: contents of respective components are expressed in mass percent, forsterite which accounts of 60% of the total amount, fayalite which accounts of 20% of the total amount, magnesia which accounts of 20% of the total amount are evenly mixed, 1%-5% naphthalene binder is added by taking mixed powder as a basis, they are moulded by a frictional press, dried at 110° C.-150° C., burned at a high temperature above 1000° C. to obtain aggregate composite hortonolite raw materials; wherein the amount of the added naphthalene binder is 1%-5% by taking the above mentioned mixed powder as a basis; preferably, the amount of the added naphthalene binder is 2%-5% by taking the above mentioned mixed powder as a basis; in the present embodiment, the amount of the added naphthalene binder is 3% by taking the above mentioned mixed powder as a basis.

A portion, which has granularity ≤5 mm, of the above mentioned manufactured aggregate composite hortonolite raw material is made account for 70% (mass percent) of the total amount, a portion which has granularity ≤0.088 mm is made account for 30% (mass percent) of the total amount, then 1%-5% (mass percent) naphthalene binder is additionally added by taking the aggregate composite hortonolite raw material as a basis, thermal insulating layer raw materials are prepared after evenly mixing; preferably, here, the amount of the added naphthalene binder is 2%-5% by taking the aggregate composite hortonolite raw material as a basis; in the present embodiment, the amount of the added naphthalene binder is 4% by taking the aggregate composite hortonolite raw material as a basis.

(3) the above mentioned flame retardant coating raw material and thermal insulating layer raw material are spaced and loaded in a mold by using corrugated thin iron sheets, pressed into green bricks by a press machine after the thin iron sheets are removed, kept at a temperature of 110° C. for 24 hours, dried, and burned into low heat-conducting magnesium-aluminium spinel bricks at a temperature of 1750° C. in a tunnel kiln.

wherein the sequence of step (1) and step (2) is irrelevant.

After the above mentioned three steps, the low heat-conducting magnesium-aluminium spinel brick is obtained.

Embodiment 6

The present embodiment provides a manufacturing method of a magnesium-aluminium spinel brick and a magnesium-aluminium spinel brick manufactured by employing the method, which may be used for a transition zone of a cement kiln. The magnesium-aluminium spinel brick includes a flame retardant coating and a thermal insulating layer. Specific manufacturing steps are as follows:

(1) preparation of flame retardant coating raw materials: contents of respective components are expressed in mass percent, sintered magnesia, granularity is ≤5 mm, accounts for 70% of total amount;

magnesium-aluminium spinel, granularity is ≤4 mm, accounts for 10% of total amount;

fused magnesia, granularity is ≤3 mm, accounts for 15% of total amount;

corundum, granularity is ≤2 mm, accounts for 5% of total amount.

The above mentioned raw materials are weighted, mixed, and compounded by the naphthalene binder to manufacture flame retardant coating raw materials of the low heat-conducting magnesium-aluminium spinel brick. The amount of the added naphthalene binder is 1%-5% by taking the above mentioned mixed powder as a basis. Preferably, the amount of the added naphthalene binder is 2%-5% by taking the above mentioned mixed powder as a basis. In the present embodiment, the amount of the added naphthalene binder is 2% by taking the above mentioned mixed powder as a basis.

(2) preparation of thermal insulating layer raw materials: contents of respective components are expressed in mass percent, forsterite which accounts of 50% of the total amount, fayalite which accounts of 30% of the total amount, magnesia which accounts of 20% of the total amount are evenly mixed, 1%-5% naphthalene binder is added by taking the mixed powder as a basis, they are moulded by a frictional press, dried at 110° C.-150° C., burned at a high temperature above 1000° C. to obtain aggregate composite hortonolite raw materials; wherein the amount of the added naphthalene binder is 1%-5% by taking the above mentioned mixed powder as a basis; preferably, the amount of the added naphthalene binder is 2%-5% by taking the above mentioned mixed powder as a basis; in the present embodiment, the amount of the added naphthalene binder is 5% by taking the above mentioned mixed powder as a basis.

A portion, which has granularity ≤5 mm, of the above mentioned manufactured aggregate composite hortonolite raw material is made account for 69% (mass percent) of the total amount, a portion which has granularity ≤0.088 mm is made account for 31% (mass percent) of the total amount, then 1%-5% (mass percent) naphthalene binder is additionally added by taking the aggregate composite hortonolite raw material as a basis, thermal insulating layer raw materials are prepared after evenly mixing; preferably, here, the amount of the added naphthalene binder is 2%-5% by taking the aggregate composite hortonolite raw material as a basis; in the present embodiment, the amount of the added naphthalene binder is 3% by taking the aggregate composite hortonolite raw material as a basis.

(3) the above mentioned flame retardant coating raw material and thermal insulating layer raw material are spaced and loaded in a mold by using corrugated thin iron sheets, pressed into green bricks by a press machine after the thin iron sheets are removed, kept at a temperature of 110° C. for 24 hours, dried, and burned into low heat-conducting magnesium-aluminium spinel bricks at a temperature of 1600° C. in a tunnel kiln.

wherein the sequence of step (1) and step (2) is irrelevant.

After the above mentioned three steps, the low heat-conducting magnesium-aluminium spinel brick is obtained.

Embodiment 7

The present embodiment provides a manufacturing method of a magnesium-aluminium spinel brick and a magnesium-aluminium spinel brick manufactured by employing the method, which may be used for a transition zone of a cement kiln. The magnesium-aluminium spinel brick includes a flame retardant coating and a thermal insulating layer. Specific manufacturing steps are as follows:

(1) preparation of flame retardant coating raw materials: contents of respective components are expressed in mass percent, sintered magnesia, granularity is ≤5 mm, accounts for 70% of total amount;

magnesium-aluminium spinel, granularity is ≤4 mm, accounts for 10% of total amount;

fused magnesia, granularity is ≤3 mm, accounts for 10% of total amount;

corundum, granularity is ≤2 mm, accounts for 10% of total amount.

The above mentioned raw materials are weighted, mixed, and compounded by the naphthalene binder to manufacture flame retardant coating raw materials of the low heat-conducting magnesium-aluminium spinel brick. The amount of the added naphthalene binder is 1%-5% by taking the above mentioned mixed powder as a basis. In the present embodiment, the amount of the added naphthalene binder is 1% by taking the above mentioned mixed powder as a basis.

(2) preparation of thermal insulating layer raw materials: contents of respective components are expressed in mass percent, forsterite which accounts of 55% of the total amount, fayalite which accounts of 35% of the total amount, magnesia which accounts of 10% of the total amount are evenly mixed, 1%-5% naphthalene binder is added by taking the mixed powder as a basis, they are moulded by a frictional press, dried at 110° C.-150° C., burned at a high temperature above 1000° C. to obtain aggregate composite hortonolite raw materials; wherein the amount of the added naphthalene binder is 1%-5% by taking the above mentioned mixed powder as a basis; preferably, the amount of the added naphthalene binder is 2%-5% by taking the above mentioned mixed powder as a basis; in the present embodiment, the amount of the added naphthalene binder is 3% by taking the above mentioned mixed powder as a basis.

A portion, which has granularity ≤5 mm, of the above mentioned manufactured aggregate composite hortonolite raw material is made account for 75% (mass percent) of the total amount, a portion which has granularity ≤0.088 mm is made account for 25% (mass percent) of the total amount, then 1%-5% (mass percent) naphthalene binder is additionally added by taking the aggregate composite hortonolite raw material as a basis, thermal insulating layer raw materials are prepared after evenly mixing; in the present embodiment, the amount of the added naphthalene binder is 1% by taking the aggregate composite hortonolite raw material as a basis.

(3) the above mentioned flame retardant coating raw material and thermal insulating layer raw material are spaced and loaded in a mold by using corrugated thin iron sheets, pressed into green bricks by a press machine after the thin iron sheets are removed, kept at a temperature of 110° C. for 24 hours, dried, and burned into low heat-conducting magnesium-aluminium spinel bricks at a temperature of 1580° C. in a tunnel kiln.

wherein the sequence of step (1) and step (2) is irrelevant.

After the above mentioned three steps, the low heat-conducting magnesium-aluminium spinel brick is obtained.

Embodiment 8

The present embodiment provides a manufacturing method of a magnesium-aluminium spinel brick and a magnesium-aluminium spinel brick manufactured by employing the method, which may be used for a transition zone of a cement kiln. The magnesium-aluminium spinel brick includes a flame retardant coating and a thermal insulating layer. Specific manufacturing steps are as follows:

(1) preparation of flame retardant coating raw materials: contents of respective components are expressed in mass percent, sintered magnesia, granularity is ≤5 mm, accounts for 50% of total amount;

magnesium-aluminium spinel, granularity is ≤4 mm, accounts for 20% of total amount;

fused magnesia, granularity is ≤3 mm, accounts for 20% of total amount;

corundum, granularity is ≤2 mm, accounts for 10% of total amount.

The above mentioned raw materials are weighted, mixed, and compounded by the naphthalene binder to manufacture flame retardant coating raw materials of the low heat-conducting magnesium-aluminium spinel brick. The amount of the added naphthalene binder is 1%-5% by taking the above mentioned mixed powder as a basis. Preferably, the amount of the added naphthalene binder is 2%-5% by taking the above mentioned mixed powder as a basis, in the present embodiment, the amount of the added naphthalene binder is 4% by taking the above mentioned mixed powder as a basis.

(2) preparation of thermal insulating layer raw materials: contents of respective components are expressed in mass percent, forsterite which accounts of 55% of the total amount, fayalite which accounts of 20% of the total amount, magnesia which accounts of 25% of the total amount are evenly mixed, 1%-5% naphthalene binder is added by taking the mixed powder as a basis, they are moulded by a frictional press, dried at 110° C.-150° C., burned at a high temperature above 1000° C. to obtain aggregate composite hortonolite raw materials; wherein the amount of the added naphthalene binder is 1%-5% by taking the above mentioned mixed powder as a basis; preferably, the amount of the added naphthalene binder is 2%-5% by taking the above mentioned mixed powder as a basis; in the present embodiment, the amount of the added naphthalene binder is 4% by taking the above mentioned mixed powder as a basis.

A portion, which has granularity ≤5 mm, of the above mentioned manufactured aggregate composite hortonolite raw material is made account for 68% (mass percent) of the total amount, a portion which has granularity ≤0.088 mm is made account for 32% (mass percent) of the total amount, then 1%-5% (mass percent) naphthalene binder is additionally added by taking the aggregate composite hortonolite raw material as a basis, thermal insulating layer raw materials are prepared after evenly mixing; in the present embodiment, the amount of the added naphthalene binder is 3% by taking the aggregate composite hortonolite raw material as a basis.

(3) the above mentioned flame retardant coating raw material and thermal insulating layer raw material are spaced and loaded in a mold by using corrugated thin iron sheets, pressed into green bricks by a press machine after the thin iron sheets are removed, kept at a temperature of 110° C. for 24 hours, dried, and burned into low heat-conducting magnesium-aluminium spinel bricks at a temperature of 1650° C. in a tunnel kiln.

wherein the sequence of step (1) and step (2) is irrelevant.

After the above mentioned three steps, the low heat-conducting magnesium-aluminium spinel brick is obtained.

In the following, a performance test is performed on magnesium-aluminium spinel bricks obtained by the above mentioned 8 embodiments as follows.

TABLE 3 comparison of high temperature antiflex strength of the magnesium-aluminium spinel brick of the present invention and the magnesium-aluminium spinel brick of the prior art

| item | | high temperature antiflex strength/MPa (keep the temperature at 1100° C. for 0.5 hours) | high temperature antiflex strength/MPa (keep the temperature at 1400° C. for 0.5 hours) |
|---|---|---|---|
| prior magnesium-aluminium spinel brick | | 4.73 | 1.12 |
| Embodiment 1 | flame retardant coating | 4.67 | 1.04 |
| | thermal insulating layer | 4.34 | 1.21 |
| | bonding spot between flame retardant coating and thermal insulating layer | 4.12 | 1.13 |
| Embodiment 2 | flame retardant coating | 4.13 | 0.91 |
| | thermal insulating layer | 4.15 | 0.98 |
| | bonding spot between flame retardant coating and thermal insulating layer | 4.06 | 0.95 |
| Embodiment 3 | flame retardant coating | 3.70 | 0.84 |
| | thermal insulating layer | 3.68 | 0.88 |
| | bonding spot between flame retardant coating and thermal insulating layer | 3.73 | 0.86 |
| Embodiment 4 | flame retardant coating | 3.51 | 0.56 |
| | thermal insulating layer | 3.24 | 0.51 |
| | bonding spot between flame retardant coating and thermal insulating layer | 3.17 | 0.58 |
| Embodiment 5 | flame retardant coating | 4.11 | 0.85 |
| | thermal insulating layer | 4.23 | 0.90 |
| | bonding spot between flame retardant coating and thermal insulating layer | 4.06 | 0.88 |
| Embodiment 6 | flame retardant coating | 4.18 | 0.77 |
| | thermal insulating layer | 4.06 | 0.74 |
| | bonding spot between flame retardant coating and thermal insulating layer | 4.00 | 0.71 |
| Embodiment 7 | flame retardant coating | 3.66 | 0.73 |
| | thermal insulating layer | 3.57 | 0.69 |
| | bonding spot between flame retardant coating and thermal insulating layer | 3.60 | 0.75 |
| Embodiment 8 | flame retardant coating | 4.20 | 0.81 |
| | thermal insulating layer | 4.01 | 0.86 |
| | bonding spot between flame retardant coating and thermal insulating layer | 3.94 | 0.83 |

TABLE 4 physicochemical indices of magnesium-aluminium spinel brick of the present invention

| item | | volume density | room temperature compressive resistance | 0.2 MPa refractoriness underload | apparent porosity | thermal shock stability (1100° C. water-cooling) | coefficient of thermal conductivity at 700° C. | coefficient of expansion at 1450° C. |
| unit | | g/cm³ | MPa | ° C. | % | times | W/m·k | W/m·k |
|---|---|---|---|---|---|---|---|---|
| Embodiment 1 | flame retardant coating | 2.96 | 65 | >1700 | 15.5 | >10 | 3.713 | 1.77 |
| | thermal insulating layer | 2.63 | 42 | 1684.5 | 23.1 | / | 2.508 | 1.58 |

TABLE 4-continued physicochemical indices of magnesium-aluminium spinel brick of the present invention

| | item<br>unit | volume<br>density<br>g/cm³ | room<br>temperature<br>compressive<br>resistance<br>MPa | 0.2 MPa<br>refractoriness<br>underload<br>° C. | apparent<br>porosity<br>% | thermal shock<br>stability<br>(1100° C.<br>water-cooling)<br>times | coefficient<br>of thermal<br>conductivity at<br>700° C.<br>W/m · k | coefficient of<br>expansion at<br>1450° C.<br>W/m · k |
|---|---|---|---|---|---|---|---|---|
| Embodiment 2 | flame retardant coating | 2.94 | 58 | >1700 | 16.1 | >10 | 3.735 | 1.78 |
| | thermal insulating layer | 2.65 | 39 | 1651.2 | 22.6 | / | 2.539 | 1.61 |
| Embodiment 3 | flame retardant coating | 2.93 | 54 | 1675.1 | 17.2 | >10 | 3.746 | 1.88 |
| | thermal insulating layer | 2.68 | 23 | 1590.6 | 21.1 | / | 2.711 | 1.60 |
| Embodiment 4 | flame retardant coating | 2.90 | 49 | 1683.5 | 17.8 | >10 | 3.725 | 1.96 |
| | thermal insulating layer | 2.71 | 25 | 1610 | 20.7 | / | 2.763 | 1.69 |
| Embodiment 5 | flame retardant coating | 2.95 | 60 | >1700 | 15.7 | >10 | 3.715 | 1.75 |
| | thermal insulating layer | 2.60 | 33 | 1637 | 22.8 | / | 2.515 | 1.57 |
| Embodiment 6 | flame retardant coating | 2.94 | 55 | >1700 | 16.3 | >10 | 3.741 | 1.82 |
| | thermal insulating layer | 2.66 | 35 | 1655 | 23.3 | / | 2.522 | 1.63 |
| Embodiment 7 | flame retardant coating | 2.93 | 49 | 1692.5 | 16.9 | >10 | 3.746 | 1.90 |
| | thermal insulating layer | 2.66 | 29 | 1617 | 21.5 | / | 2.526 | 1.66 |
| Embodiment 8 | flame retardant coating | 2.94 | 59 | >1700 | 15.9 | >10 | 3.737 | 1.79 |
| | thermal insulating layer | 2.64 | 42 | 1670.5 | 22.6 | / | 2.551 | 1.62 |

As may be seen from Tables 3 and 4, the flame retardant coating of the magnesium-aluminium spinel brick reserves good high temperature mechanical behavior such as erosion resistance, scour resistance, thermal shock resistance, mechanical stress resistance, which the magnesium-aluminium spinel brick has, but the coefficient of thermal conductivity is comparatively high, thermal loss is comparatively large; whereas the thermal insulating layer has a coefficient of thermal conductivity lower than that of the flame retardant coating, while reserving good high temperature mechanical behavior of the flame retardant coating. Two kinds of materials of different properties of the flame retardant coating and the thermal insulating layer can be bonded firmly. Strengths of the magnesium-aluminium spinel, the hortonolite as well as their bonding spot are very close to each other. The formula of the thermal insulating layer can increase the sintering temperature of the thermal insulating layer, make it match the flame retardant coating, such that consistency of linear expansivity of the flame retardant coating and the thermal insulating layer is guaranteed. As such, on the premise that service performance is guaranteed, reduction in the coefficient of thermal conductivity is achieved.

Preferably, compared to other embodiments, for embodiments 1, 2, 5, 6 and 8: (1) coefficients of expansion of the flame retardant coating and the thermal insulating layer are more consistent; (2) mechanical behavior is better; (3) bonding of the flame retardant coating and the thermal insulating layer is more firm.

Finally, it is to be explained that, the above embodiments are only used to explain the technical solutions of the present invention, but not to limit the present invention. Although the present invention is explained in detail with reference to embodiments, those ordinary skilled in the art should understand that, without departing from the spirit and the scope of the technical solutions of the present invention, modifications or equivalent substitutions are made to the technical solutions of the present invention, which are to be covered by the scope of the claims of the present invention.

What is claimed is:

1. A manufacturing method of a magnesium-aluminium spinel brick, wherein the magnesium-aluminium spinel brick comprises a flame retardant coating and a thermal insulating layer, the manufacturing method of the magnesium-aluminium spinel brick comprises specific manufacturing steps as follows:

step (1) preparing flame retardant coating raw materials using the following components by mass percent, evenly mixing 40%-70% of sintered magnesia having a granularity ≤5 mm, 10%-40% of fused magnesia having a granularity ≤3 mm, 10%-20% of magnesium-aluminium spinel having a granularity ≤4 mm, and 0%-10% (excluding 0%) of corundum having a granularity ≤2 mm to prepare flame retardant coating raw material mixed powder, then additionally adding 1%-5% of naphthalene binder by taking the flame retardant coating raw material mixed powder as a basis, for an even mixing to prepare the flame retardant coating raw materials;

step (2) preparing thermal insulating layer raw materials using the following components by mass percent, evenly mixing 40%-60% of forsterite, 10%-40% of fayalite, and 10%-50% of magnesia to obtain mixed powder, adding 1%-5% of naphthalene binder by taking the mixed powder as a basis to obtain a mixed material, moulding the mixed material by a frictional press, drying the mixed material at 110° C.-150° C., and then burning the mixed material at a temperature of above 1000° C. to obtain aggregate composite hortonolite raw materials;

taking aggregate composite hortonolite having a granularity ≤5 mm from the aggregate composite hortonolite raw materials as a single raw material, adding 1%-5% of naphthalene binder to the aggregate composite hortonolite having the granularity ≤5 mm for an even mixing to prepare the thermal insulating layer raw materials; and step (3) spacing and loading the flame retardant coating raw materials and the thermal insulating layer raw materials in a mold by using corrugated thin iron sheets, pressing the flame retardant coating raw materials and the thermal insulating layer raw materials into green bricks by a press machine, keeping the green bricks at a temperature of 110° C. for 24 hours, drying the green bricks, and burning the green bricks into the magnesium-aluminium spinel brick at a temperature of 1550° C.-1750° C. in a tunnel kiln; wherein a sequence of the step (1) and the step (2) are allowed to be inversed.

2. The manufacturing method of the magnesium-aluminium spinel brick according to claim 1, wherein:
step (1) the preparation of the flame retardant coating raw materials using the following components by mass percent, evenly mixing 45%-70% of sintered magnesia having the granularity ≤5 mm, 15%-40% of fused magnesia having the granularity ≤3 mm, 10%-20% of magnesium-aluminium spinel having the granularity ≤4 mm, and 0%-40% (excluding 0%) of corundum having the granularity ≤2 mm to prepare the flame retardant coating raw material mixed powder, then additionally adding 2%-5% of naphthalene binder by taking the flame retardant coating raw material mixed powder as a basis for an even mixing to prepare the flame retardant coating raw materials;

step (2) the preparation of the thermal insulating layer raw materials using the following components by mass percent, evenly mixing 50%-60% of forsterite, 20%-30% of fayalite, and 20%-30% of magnesia to obtain the mixed powder, adding 2%-5% of naphthalene binder by taking the mixed powder as a basis to obtain the mixed material, moulding the mixed material by the frictional press, drying the mixed material at 110° C.-150° C., burning the mixed material at the high temperature of above 1000° C. to obtain the aggregate composite hortonolite raw materials; and taking the aggregate composite hortonolite having the granularity ≤5 mm from the aggregate composite hortonolite raw materials as a single raw material, adding 2%-5% of naphthalene binder to the aggregate composite hortonolite having the granularity ≤5 mm for an even mixing to prepare the thermal insulating layer raw materials.

3. The manufacturing method of the magnesium-aluminium spinel brick according to claim 1, wherein:
in the step (2), the step of taking the aggregate composite hortonolite having the granularity ≤5 mm from the aggregate composite hortonolite raw materials as a single raw material comprises: taking 65%-75% (mass percent content) of a first aggregate composite hortonolite having the granularity ≤5 mm and 25-35% (mass percent content) of a second aggregate composite hortonolite having a granularity ≤0.088 mm as the single raw material.

4. The manufacturing method of the magnesium-aluminium spinel brick according to claim 3, wherein: a mass percent content of the aggregate composite hortonolite having the granularity ≤5 mm is 67%-70%, and a mass percent content of the aggregate composite hortonolite having the granularity ≤0.088 mm is 30%-33%.

5. The manufacturing method of the magnesium-aluminium spinel brick according to claim 4, wherein: the mass percent content of the aggregate composite hortonolite having the granularity ≤5 mm is 67%, accordingly the mass percent content of the aggregate composite hortonolite having the granularity ≤0.088 mm is 33%; or the mass percent content of the aggregate composite hortonolite having the granularity ≤5 mm is 68%, accordingly the mass percent content of the aggregate composite hortonolite having the granularity ≤0.088 mm is 32%; or the mass percent content of the aggregate composite hortonolite having the granularity ≤5 mm is 70%, accordingly the mass percent content of the aggregate composite hortonolite having the granularity ≤0.088 mm is 30%.

6. The manufacturing method of the magnesium-aluminium spinel brick according to claim 1, wherein the naphthalene binder is naphthalene sulfonate formaldehyde condensate.

7. The manufacturing method of the magnesium-aluminium spinel brick according to claim 1, wherein
in the flame retardant coating raw materials:
a mass percent content of MgO in the sintered magnesia is above 96.5%; a mass percent content of MgO in the fused magnesia is above 97%; the magnesium-aluminium spinel is sintered magnesium-aluminium spinel or fused magnesium-aluminium spinel, a mass percent content of $Al_2O_3$ in the sintered magnesium-aluminium spinel is 66%-73%, a mass percent content of $Al_2O_3$ in the fused magnesium-aluminium spinel is 70%-75%; a mass percent content of $Al_2O_3$ in the corundum is above 99%;
in the thermal insulating layer raw materials:
a mass percent content of MgO in the forsterite is 62%-67% and a mass percent content of $SiO_2$ in the forsterite is 25%-30%; a mass percent content of FeO in the fayalite is 48%-53% and a mass percent content of $SiO_2$ in the fayalite is 41%-46%; the magnesia is sintered magnesia or fused magnesia, a mass percent content of MgO in the sintered magnesia is above 96.5%, a mass percent content of MgO in the fused magnesia is above 97%.

8. A magnesium-aluminium spinel brick, wherein the magnesium-aluminium spinel brick is manufactured by the manufacturing method according to claim 1.

9. The manufacturing method of the magnesium-aluminium spinel brick according to claim 2, wherein
in the flame retardant coating raw materials:
a mass percent content of MgO in the sintered magnesia is above 96.5%; a mass percent content of MgO in the fused magnesia is above 97%; the magnesium-aluminium spinel is sintered magnesium-aluminium spinel or fused magnesium-aluminium spinel, a mass percent content of $Al_2O_3$ in the sintered magnesium-aluminium spinel is 66%-73%, a mass percent content of $Al_2O_3$ in the fused magnesium-aluminium spinel is 70%-75%; a mass percent content of $Al_2O_3$ in the corundum is above 99%;

in the thermal insulating layer raw materials:
a mass percent content of MgO in the forsterite is 62%-67% and a mass percent content of $SiO_2$ in the forsterite is 25%-30%; a mass percent content of FeO in the fayalite is 48%-53% and a mass percent content of $SiO_2$ in the fayalite is 41%-46%; the magnesia is sintered magnesia or fused magnesia, a mass percent content of MgO in the sintered magnesia is above 96.5%, a mass percent content of MgO in the fused magnesia is above 97%.

10. The manufacturing method of the magnesium-aluminium spinel brick according to claim 3, wherein
in the flame retardant coating raw materials:
a mass percent content of MgO in the sintered magnesia is above 96.5%; a mass percent content of MgO in the fused magnesia is above 97%; the magnesium-aluminium spinel is sintered magnesium-aluminium spinel or fused magnesium-aluminium spinel, a mass percent content of $Al_2O_3$ in the sintered magnesium-aluminium spinel is 66%-73%, a mass percent content of $Al_2O_3$ in the fused magnesium-aluminium spinel is 70%-75%; a mass percent content of $Al_2O_3$ in the corundum is above 99%;

in the thermal insulating layer raw materials:
a mass percent content of MgO in the forsterite is 62%-67% and a mass percent content of $SiO_2$ in the forsterite is 25%-30%; a mass percent content of FeO in the fayalite is 48%-53% and a mass percent content of $SiO_2$ in the fayalite is 41%-46%; the magnesia is sintered magnesia or fused magnesia, a mass percent content of MgO in the sintered magnesia is above 96.5%, a mass percent content of MgO in the fused magnesia is above 97%.

11. The manufacturing method of the magnesium-aluminium spinel brick according to claim 4, wherein
in the flame retardant coating raw materials:
a mass percent content of MgO in the sintered magnesia is above 96.5%; a mass percent content of MgO in the fused magnesia is above 97%; the magnesium-aluminium spinel is sintered magnesium-aluminium spinel or fused magnesium-aluminium spinel, a mass percent content of $Al_2O_3$ in the sintered magnesium-aluminium spinel is 66%-73%, a mass percent content of $Al_2O_3$ in the fused magnesium-aluminium spinel is 70%-75%; a mass percent content of $Al_2O_3$ in the corundum is above 99%;

in the thermal insulating layer raw materials:
a mass percent content of MgO in the forsterite is 62%-67% and a mass percent content of $SiO_2$ in the forsterite is 25%-30%; a mass percent content of FeO in the fayalite is 48%-53% and a mass percent content of $SiO_2$ in the fayalite is 41%-46%; the magnesia is sintered magnesia or fused magnesia, a mass percent content of MgO in the sintered magnesia is above 96.5%, a mass percent content of MgO in the fused magnesia is above 97%.

12. The manufacturing method of the magnesium-aluminium spinel brick according to claim 5, wherein in the flame retardant coating raw materials:
a mass percent content of MgO in the sintered magnesia is above 96.5%; a mass percent content of MgO in the fused magnesia is above 97%; the magnesium-aluminium spinel is sintered magnesium-aluminium spinel or fused magnesium-aluminium spinel, a mass percent content of $Al_2O_3$ in the sintered magnesium-aluminium spinel is 66%-73%, a mass percent content of $Al_2O_3$ in the fused magnesium-aluminium spinel is 70%-75%; a mass percent content of $Al_2O_3$ in the corundum is above 99%;

in the thermal insulating layer raw materials:
a mass percent content of MgO in the forsterite is 62%-67% and a mass percent content of $SiO_2$ in the forsterite is 25%-30%; a mass percent content of FeO in the fayalite is 48%-53% and a mass percent content of $SiO_2$ in the fayalite is 41%-46%; the magnesia is sintered magnesia or fused magnesia, a mass percent content of MgO in the sintered magnesia is above 96.5%, a mass percent content of MgO in the fused magnesia is above 97%.

13. The magnesium-aluminium spinel brick according to claim 8, wherein:
step (1) preparing the flame retardant coating raw materials using the following components by mass percent, evenly mixing 45%-70% of sintered magnesia having the granularity ≤5 mm, 15%-40% of fused magnesia having the granularity ≤3 mm, 10%-20% of magnesium-aluminium spinel having the granularity ≤4 mm, and 0%-40% (excluding 0%) of corundum having the granularity ≤2 mm to prepare the flame retardant coating raw material mixed powder, then additionally adding 2%-5% of naphthalene binder by taking the flame retardant coating raw material mixed powder as a basis for an even mixing to prepare the flame retardant coating raw materials;

step (2) preparing the thermal insulating layer raw materials using the following components by mass percent, evenly mixing 50%-60% of forsterite, 20%-30% of fayalite, and 20%-30% of magnesia to obtain the mixed powder, adding 2%-5% of naphthalene binder by taking the mixed powder as a basis to obtain the mixed material, moulding the mixed material by the frictional press, drying the mixed material at 110° C.-150° C., burning the mixed material at the high temperature of above 1000° C. to obtain the aggregate composite hortonolite raw materials; and taking the aggregate composite hortonolite having the granularity ≤5 mm from the aggregate composite hortonolite raw materials as a single raw material, adding 2%-5% of naphthalene binder to the aggregate composite hortonolite having the granularity ≤5 mm for an even mixing to prepare the thermal insulating layer raw materials.

14. The magnesium-aluminium spinel brick according to claim 8, wherein:
in the step (2), the step of taking the aggregate composite hortonolite having the granularity ≤5 mm from the aggregate composite hortonolite raw materials as a single raw material comprises: taking 65%-75% (mass percent content) of a first aggregate composite hortonolite having the granularity ≤5 mm and a mass percent content of 25-35% of a second aggregate composite hortonolite having a granularity ≤0.088 mm as the single raw material.

15. The magnesium-aluminium spinel brick according to claim 14, wherein: a mass percent content of the aggregate composite hortonolite having the granularity ≤5 mm is 67%-70%, and a mass percent content of the aggregate composite hortonolite having the granularity ≤0.088 mm is 30%-33%.

16. The magnesium-aluminium spinel brick according to claim 15, wherein: the mass percent content of the aggregate composite hortonolite having the granularity ≤5 mm is 67%, accordingly the mass percent content of the aggregate composite hortonolite having the granularity ≤0.088 mm is 33%; or the mass percent content of the aggregate composite hortonolite having the granularity ≤5 mm is 68%, accordingly the mass percent content of the aggregate composite hortonolite having the granularity ≤0.088 mm is 32%; or the mass percent content of the aggregate composite hortonolite having the granularity ≤5 mm is 70%, accordingly the mass percent content of the aggregate composite hortonolite having the granularity ≤0.088 mm is 30%.

17. The magnesium-aluminium spinel brick according to claim 8, wherein the naphthalene binder is naphthalene sulfonate formaldehyde condensate.

18. The magnesium-aluminium spinel brick according to claim 8, wherein in the flame retardant coating raw materials:
a mass percent content of MgO in the sintered magnesia is above 96.5%; a mass percent content of MgO in the fused magnesia is above 97%; the magnesium-aluminium spinel is sintered magnesium-aluminium spinel or fused magnesium-aluminium spinel, a mass percent content of $Al_2O_3$ in the sintered magnesium-aluminium spinel is 66%-73%, a mass percent content of $Al_2O_3$ in the fused magnesium-aluminium spinel is 70%-75%; a mass percent content of $Al_2O_3$ in the corundum is above 99%;

in the thermal insulating layer raw materials:
a mass percent content of MgO in the forsterite is 62%-67% and a mass percent content of $SiO_2$ in the forsterite is 25%-30%; a mass percent content of FeO in the fayalite is 48%-53% and a mass percent content of $SiO_2$ in the fayalite is 41%-46%; the magnesia is sintered magnesia or fused magnesia, a mass percent content of MgO in the sintered magnesia is above 96.5%, a mass percent content of MgO in the fused magnesia is above 97%.

\* \* \* \* \*